United States Patent
Kurokami et al.

(10) Patent No.: US 6,963,147 B2
(45) Date of Patent: Nov. 8, 2005

(54) POWER CONVERTER AND POWER UNIT

(75) Inventors: Seiji Kurokami, Kyoto (JP); Nobuyoshi Takehara, Kyoto (JP); Manabu Nakanishi, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 10/792,713

(22) Filed: Mar. 5, 2004

(65) Prior Publication Data

US 2004/0174720 A1 Sep. 9, 2004

(30) Foreign Application Priority Data

Mar. 7, 2003 (JP) ........................................ 2003-061256
Feb. 26, 2004 (JP) ........................................ 2004-050821

(51) Int. Cl.$^7$ ............................................... H01L 35/30
(52) U.S. Cl. ........................................ 307/154; 136/205
(58) Field of Search .............................. 136/205, 206; 307/154; 363/41

(56) References Cited

U.S. PATENT DOCUMENTS

| | | | |
|---|---|---|---|
| 5,548,504 A | 8/1996 | Takehara | 363/65 |
| 5,892,354 A | 4/1999 | Nagao et al. | 323/299 |
| 6,605,881 B2 | 8/2003 | Takehara et al. | 307/86 |
| 6,768,047 B2 * | 7/2004 | Chang et al. | 136/244 |
| 2001/0048605 A1 | 12/2001 | Kurokami et al. | 363/56.03 |
| 2002/0044473 A1 | 4/2002 | Toyomura et al. | 363/142 |
| 2002/0105765 A1 | 8/2002 | Kondo et al. | 361/42 |
| 2003/0218888 A1 | 11/2003 | Suzui et al. | 363/34 |
| 2004/0027112 A1 | 2/2004 | Kondo et al. | 323/355 |
| 2004/0117676 A1 | 6/2004 | Kobayashi et al. | 713/300 |

* cited by examiner

Primary Examiner—Shawn Riley May
(74) Attorney, Agent, or Firm—Fitzpatrick, Cella, Harper & Scinto

(57) ABSTRACT

Control means is provided, in which the whole of the phase difference of a power waveform of each phase is matched to a value dividing a cycle of the power waveform into n-equal portions, and at the same time, the whole of the power value of each phase is controlled to be identical, so that the power conversion unit having a n-alternating current output (n is an integer numeral serving as $n \geq 2$) connected to the direct current power source and smoothing means provided between the direct current power source and the power conversion unit are made small in capacity.

25 Claims, 7 Drawing Sheets

POWER CONVERTER AND POWER UNIT

BACKGROUND OF THE INVENTION

1. Field of the Invention

The present invention relates to a power converter comprising a power conversion unit having an n-phase alternating current output (n is an integer number with n≧2) connected to a direct current power source, and smoothing means provided between the direct current power source and the power conversion unit, and a power unit using the same.

2. Related Background Art

In recent years, a system tied-distributed power source such as a photovoltaic power generating system has been in widespread use.

In such a power unit, the direct current power outputted from the direct current power source is inputted to an inverter serving as the power conversion unit, and is outputted to a system serving as a load. Further, the input portion of the inverter is connected to smoothing means, thereby stabilizing the voltage and the current of the direct current power source. In general, this smoothing means has a smoothing capacitor connected in parallel to the input portion of the inverter.

Meanwhile, since the instantaneous power of a single phase inverter fluctuates at the frequency two times an output alternating current, there is arisen a power fluctuation two times an output frequency between the direct current power and the output power from the direct current power source, and it is necessary for the smoothing capacitor absorbing a relatively low frequency fluctuation to have a large capacity. Hence, as for the smoothing capacitor, an aluminum electrolytic capacitor is selected, which is characterized in that the size and mass per electric capacity are small and the cost is low (for example, refer to Japanese Patent Application Laid-Open No. H01-107661).

Further, as for the inverter making a three-phase output, it is known that the electrolytic capacity of the smoothing capacitor becomes small (for example, refer to Japanese Patent Application Laid-Open No. S58-33976).

However, if the electrolytic capacity of the smoothing capacitor used as the smoothing means becomes even smaller, it is possible to realize additional downsizing, weight saving and lower cost and, thus, the smoothing means is desired to be smaller in capacity.

Further, it is generally known that the aluminum electrolytic capacitor is extremely short-lived due to increase in ambient temperature and self-heating. When the possibility of giving a long life to the power unit is considered, a question which arises is a lifetime of the aluminum electrolytic capacitor. Use of a solid capacitor, which is said to deliver a life longer than a film capacitor, a laminated ceramic capacitor and the like is conceivable, but an increase in the size and mass as well as cost up come into question.

On the other hand, as for the inverter making the three-phase output, just simply making the three-phase output does not make electric capacity sufficiently small under the existing circumstances.

Furthermore, not only for the smoothing capacitor, but also for other smoothing means such as a smoothing reactor, an active power filter and the like, which stabilize the voltage and current of the direct current power source, it is similarly desired to make the capacity small.

SUMMARY OF THE INVENTION

It is an object of the present invention to make smoothing means small in capacity, which is provided between a direct current power source and a power conversion unit having an n-phase alternating current (n is an integer number with n≧2) output connected to the direct current power source.

For the above-described object, the present invention provides a power converter comprising a power conversion unit having an n-phase alternating current (n is an integer number serving as n≧2) output connected to a direct current power source, and smoothing means provided between the direct current power source and the power conversion unit, wherein the power conversion unit comprises control means which allows the whole of the phase difference of a power waveform of each phase to be matched to a value dividing a cycle of the power waveform into n-equal portions and, at the same time, the whole of a power value of each phase is controlled to be identical.

Further, the above-described present invention includes in its preferred mode:

the control means detecting an output voltage of each phase and controlling it to be a phase current inversely proportionate to the output voltage;

the smoothing means comprising a first storage portion connected in parallel with the direct current power source between the direct current power source and the power conversion unit, a bi-directional power conversion unit having one terminal connected in parallel with the first storage portion, a second storage portion connected to the other terminal of the bi-directional power conversion unit, and smoothing control means for controlling a power flow of the bi-directional conversion unit so as to make a ripple of the first storage portion small;

the smoothing control means detecting the ripple of the first storage portion and controlling the power flow of the bi-directional power conversion unit so as to make the detected ripple small;

the smoothing control means detecting a lower harmonic of the output voltage and/or the output current of the power conversion unit and controlling the bi-directional power conversion unit so as to make the ripple of the first storage portion small in accordance with the lower harmonic;

the power conversion unit outputting a two phase alternating current in which the voltage and the current of each phase of the power conversion unit are different in 90 degrees;

the control means controlling the whole of the phase difference of the output voltage and the output current of each phase of the power conversion unit to be identical;

each output phase of the power conversion unit being connected to each phase of an n-phase alternating current system having the same number of phases as the power conversion unit and making a system-tie output;

the direct current power source being a solar cell or a fuel cell; and the direct current power source comprising a solar cell or a fuel cell, and a DC/DC converter which voltage-changes and outputs the direct current output of the solar cell or the fuel cell.

Furthermore, the present invention provides a power converter characterized by comprising a direct current power source and any one of those power converters connected to a direct current power source.

In the present invention, though the n-phase alternating current is outputted, the whole of the phase difference of the power waveform of each phase of the n-phase is matched to the value dividing the cycle of the power waveform into n equal portions and, at the same time, the whole of the power value of each phase is controlled to be identical, so that the total of the instantaneous power to each phase becomes approximately constant even though a load impedance and a system voltage of each phase are different and, by the same token, the instantaneous input power of the power conversion unit becomes approximately constant except for switching components, and the energy to be processed is made minimum, thereby making the smoothing means small in capacity.

Further, the other mode of the present invention is a power converter having a power conversion unit which is connected to a direct current power source and outputs a three-phase alternating current, and smoothing means provided between the direct current power source and the power conversion unit, comprising: voltage detection means for detecting the voltage of a first phase, a second phase and a third phase of three phases; and control means in which, based on the first phase among the three phases, a second phase component of a second phase line current is increased and decreased to be adjusted in accordance with a phase voltage of the second phase, and the amount of a reverse code of the adjusted portion of the second phase component is increased and decreased to be adjusted by being distributed to the line current of the first phase and the line current of the third phase, and based on the first phase among the three phases, a third phase component of the line current of the third phase is increased and decreased to be adjusted in accordance with the phase voltage of the third phase, and the amount of the reverse code of the adjusted portion of the third phase component is increased and decreased to be adjusted by being distributed to the line current of the first phase and the line current of the second phase; and at the same time, for the total value psum(t) of an instantaneous power of the three phases:

psum(t)=the phase voltage of the first phase×the line current of the first phase+the phase voltage of the second phase×the line current of the second phase+the phase voltage of the third phase× the line current of the third phase the following expression:

$d(psum)/dt \approx 0$ is satisfied.

Further, for the total value isum(t) of the instantaneous line currents of the three phases:

isum(t)=the line current of the first phase+the line current of the second phase+the line current of the third phase, it is preferable that the other mode of the present invention satisfies the following expression:

$isum(t)=0$.

Further, where a voltage v1 of the first phase, a voltage v2 of the second phase and a voltage v3 of the third phase are given by the following expressions:

$V1=V1 \times \sin(\theta)$ $V2=V2 \times \sin(\theta+2\pi/3)$ $V3=V3 \times \sin(\theta+4\pi/3)$, based on the first phase, $Ga=V2/V1$ $Gb=V3/V1$ it is preferable to control the current i1 of the first phase, the current i2 of the second phase and the current i3 of the third phase so as to become the following expressions:

$i1=I0 \times (\sin(\theta)+I12 \times \sin(\theta+2\pi/3)+I13 \times \sin(\theta+4\pi/3))$ $i2=I0 \times ((1-2 \times Ka) \times \sin(\theta+2\pi/3)+I23 \times \sin(\theta+4\pi/3))$ $i3=I0 \times (I32 \times \sin(\theta+2\pi/3)+(1-2 \times Kb) \times \sin(\theta+4\pi/3))$ $I12+I32=2 \times Ka$ $I13+I23=2 \times Kb$ (I0 is an arbitrary number) provided that $Ka=(V2-V1)/(2 \times V2+V1)=(Ga-1)/(2 \times Ga+1)$ $Kb=(V3-V1)/(2 \times V3+V1)=(Gb-1)/(2 \times Gb+1)$.

Further, where a voltage v1 of the first phase, ×a voltage v2 of the second phase and a voltage v3 of the third phase are given by the following expressions:

$v1=V1 \times \sin(\theta)$ $v2=V2 \times \sin(\theta+2\pi/3)$ $v3=V3 \times \sin(\theta+4\pi/3)$, based on the first phase, $Ga=V2/V1$ $Gb=V3/V1$ it is preferable to control the current i1 of the first phase, the current i2 of the second phase and the current i3 of the third phase so as to become the following expressions:

$i1=I0 \times (\sin(\theta)+I12 \times \sin(\theta+2\pi/3)+I13 \times \sin(\theta+4\pi/3))$ $i2=I0 \times ((1-2 \times Ka) \times \sin(\theta+2\pi/3)+I23 \times \sin(\theta+4\pi/3))$ $i3=I0 \times (I32 \times \sin(\theta+2\pi/3)+(1-2 \times Kb) \times \sin(\theta+4\pi/3))$ $I12+I32=2 \times Ka$ $I13+I23=2 \times Kb$ (I0 is an arbitrary number) provided that $Ka=(V2-V1)/(3 \times V2)=(Ga-1)/(3 \times Ga)$ $Kb=(V3-V1)/(3 \times V3)=(Gb-1)/(3 \times Gb)$.

Further, by way of $I12=I32=Ka$ $I13=I23=Kb$, it is preferable to control the current i1 of the first phase, the current i2 of the second phase and the current i3 of the third phase so as to become the following expressions:

$i1=I0 \times (\sin(\theta)+Ka \times \sin(\theta+2\pi/3)+Kb \times \sin(\theta+4\pi/3))$ $i2=I0 \times ((1-2 \times Ka) \times \sin(\theta+2\pi/3)+Kb \times \sin(\theta+4\pi/3))$ $i3=I0 \times (Ka \times \sin(\theta+2\pi/3)+(1-2 \times Kb) \times \sin(\theta+4\pi/3))$.

Further, it is preferable to control the current i1 of the first phase, the current i2 of the second phase and the current i3 of the third phase so as to become as follows:

$$I12=2\times Ka\times(V3/(V1+V3)), I32=2\times Ka\times(V1/(V1+V3)),$$

$$I13=2\times Kb\times(V2/(V1+V2)), I23=2\times Kb\times(V1/(V1+V2)).$$

Further, it is preferable to current-control each phase current to an advancing phase or a lagging phase with the same phase.

Further, it is preferable to select a phase having the second largest size of the phase voltage among the three phases as a first reference phase.

Further, the present invention provides a power unit characterized by comprising the direct current power source and the power converter of the other mode connected to the direct current power source.

According to the present invention, even when the load impedance and the system voltage of each phase is different, since the total of the instantaneous power to each phase becomes approximately constant and, by the same token, the instantaneous power of the power converter becomes approximately constant except for switching components, and also the instantaneous phase difference between the input power and the output power becomes almost zero, the smoothing means makes the energy to be processed minimum, thereby making the smoothing means small in capacity.

Other features and advantages of the present invention will be apparent from the following description taken in conjunction with the accompanying drawings.

DESCRIPTION OF THE PREFERRED EMBODIMENTS

Figure 1:
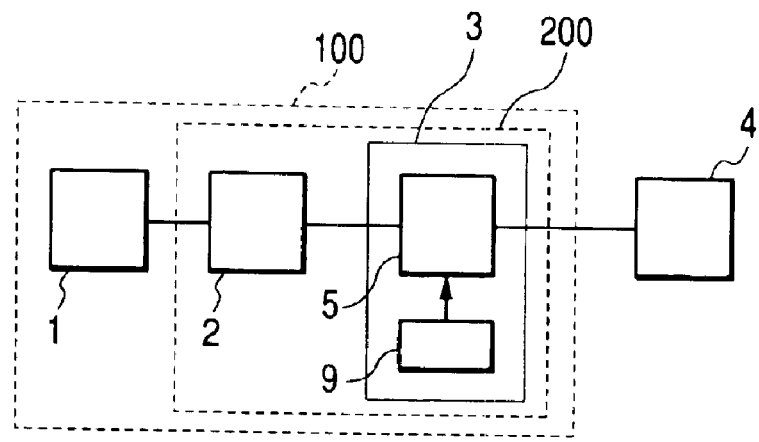
FIG. 1 is a view showing a first basic constitution of the present invention.

First, the basic constitution of the present invention will be described below based on FIGS. 1 to 4. Note that, in FIGS. 1 to 4, the same reference numerals denote the same components.

In FIG. 1, a power unit 100 is constituted by a direct current power source 1 and a power converter 200 connected thereto. The power converter 200 comprises a power conversion unit 3, which inputs a direct current power outputted from the direct current power source 1 and converts it into a polyphase alternating current power to be outputted to a polyphase load 4, and smoothing means 2 provided between the direct current power source 1 and the power conversion unit 3.

The direct current power source 1 is not particularly limited in its type, and is applicable to a direct current generator outputting the direct current power, a battery and the like. However, the present invention is effective for the direct current power source having large output impedance, and from this viewpoint, for example, a solar cell, a fuel cell, a thermoelectric generation and the like are preferable. Further, the direct current power source 1 can be constituted so as to voltage-convert the direct current power through a DC/DC converter and output the direct current power to smoothing means 2. As for the DC/DC converter, a circuit system such as a chopper system, a fly back system, a push-pull system and the like, and an insulation type such as an insulation system, a non-insulation system and the like are properly usable, and there is no limit placed on the same.

The power conversion unit 3 comprises a conversion main circuit 5 for converting the direct current into an alternating current power of a n-phase (n is the integer number of n≧2), and control means 9 for allowing the whole of the phase difference of a power waveform of each phase of the n-phase to match a value dividing the cycle of the power waveform into n equal portions and, at the same time, controlling the conversion main circuit 5 so that the whole of the power value of each phase becomes identical.

The conversion main circuit 5 may be a circuit, which can convert the direct current power from the direct current power source 1 into the n-phase alternating current power. For example, there are available a three phase bridge inverter circuit as well as a circuit constituted such as outputting a plurality of single phase bridge inverter circuits to each phase of the n-phase (for example, two sets of the single phase bridge inverter circuits are outputted to each phase of a two phase), and various types of circuits are possible to be constituted by using the well known circuit systems.

The control means 9 comprises detection means for a part or the whole of the voltage, current and power of each phase as the occasion may demand, and at the same time, comprises adjustment means for allowing the whole of the phase difference of the power waveform of each phase to match the value dividing the cycle of the power waveform into n equal portions and adjusting the whole of the power value of each phase to be identical.

The adjustment means can be constituted appropriately by CPU and DSP comprising RAM, ROM, I/O and the like, or an analog processing circuit, a digital processing circuit and the like. The adjustment of the power value of each phase by the adjustment means can be realized, for example, by adjusting the output to each phase so that the detected power of each phase can match, or by adjusting the magnitude of the output to each phase so that an apparent power which is the product of the detected voltage and current of each phase can match, or by adjusting the current value of each phase to be inversely proportional according to the voltage of each phase. The adjusting of the current value of each phase to be inversely proportional according to the voltage of each phase has a merit in that a control is simple since it is enough to perform a simple calculation. Further, the adjustment of the phase difference of the power waveform of each phase by the adjustment means can be realized by various constitutions in which, for example, reference oscillation means is provided in the interior and a reference frequency signal corresponding to the n-phase is generated by using a frequency division signal of the predetermined clock difference, and based on the reference frequency signal, an alternating current output is made.

Figure 2:
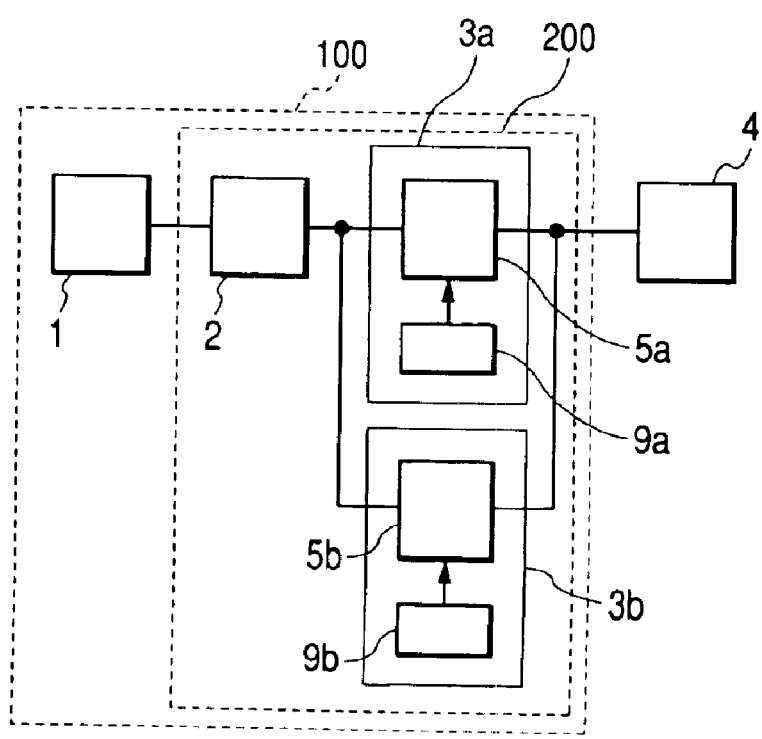
FIG. 2 is a view showing a second basic constitution of the present invention.

As shown in FIG. 2, the basic constitution can be also made such that the inputs and the outputs of a plurality of power conversion units 3a and 3b comprising conversion main circuits 5a and 5b and control means 9a and 9b respectively and inputting and outputting the n-phase are connected in parallel. In this case, since a ripple arising from a switching operation itself can be reduced by shifting the switching timing of a plurality of power conversion units 3a and 3b (for example, a phase of a carrier signal is shifted in the power a and conversion unit, which generates a PWM signal by comparing the carrier signal such as a chopping wave and a modulating signal), the power conversion unit, which is made small in capacity by the present invention, and in which the influence of the switching ripple is relatively enhanced, can further enhance the effect of its reduced capacity.

Figure 3:
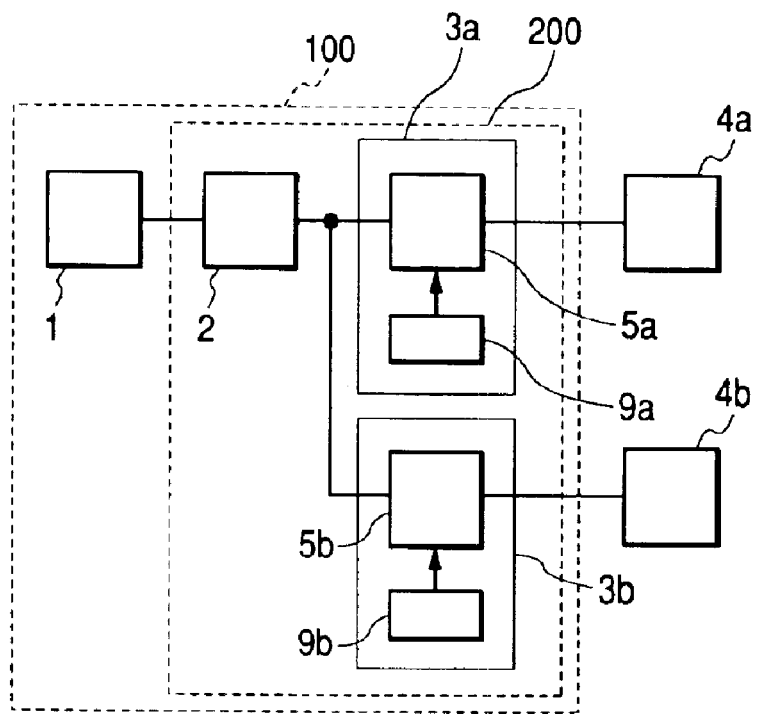
FIG. 3 is a view showing a third basic constitution of the present invention.

Further, as shown in FIG. 3, the basic constitution can be also made such that the inputs of a plurality of power conversion units 3a and 3b comprising conversion main circuits 5a and 5b and control means 9a and 9b respectively and inputting are connected in parallel, and each outputs thereof is outputted to loads 4a and 4b of separate n-phases. In this case, the output power to the load 4a from the conversion unit 3a and the magnitude, phase, and frequency of the output power to the load 4b from the conversion unit 3b do not always need to be matched. The control means 9a and 9b may share the part or the whole portion thereof for common use, and have merits of being able to realize downsizing and lower cost.

Figure 4:
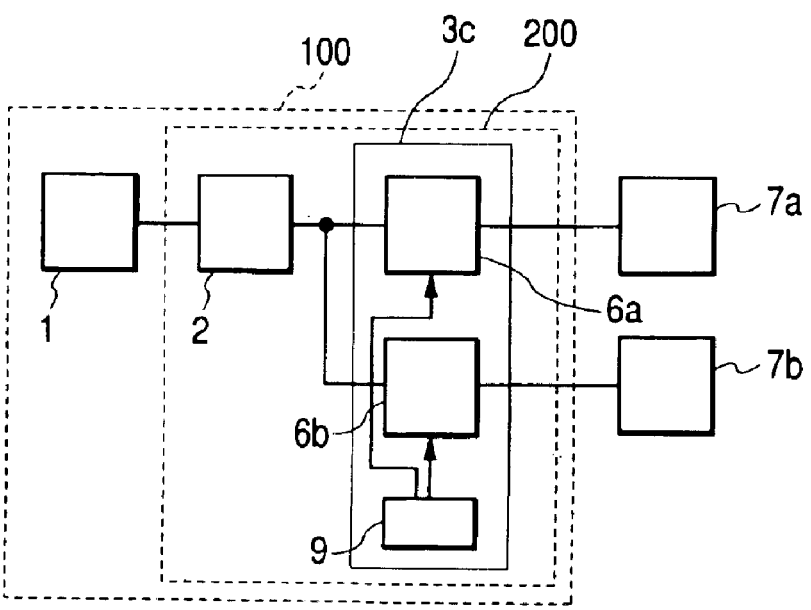
FIG. 4 is a view showing a fourth basic constitution of the present invention.

Furthermore, as shown in FIG. 4, the basic constitution can be made also by comprising, as a power conversion unit 3c, a plurality of conversion main circuits 6a and 6b for outputting a single phase, and control means 9 for controlling each conversion main circuit 6a and 6b and outputting a single phase alternating power of the conversion main circuits 6a and 6b to single phase loads 7a and 7b, respectively. The control means 9 of FIG. 4 is also the same as that described in FIG. 1, which similarly controls the phase of the output power and the magnitude of the power of the conversion main circuits 6a and 6b which output the single phase.

In any of FIGS. 1 to 4, though the phase of the n-phase alternating current power controlled by the control means 9, 9a and 9b in the power conversion units 3, 3a, 3b and 3c is a phase dividing the cycle of the n-phase alternating power into n equal portions if it is a three-phase alternating power, for example, each phase difference is controlled to be 120 degrees. This means controlling the voltage phase difference and the current phase difference of each phase to be 120 degrees in the cycle of the voltage and the current. Further, if it is a two-phase alternating current, each phase difference is controlled to be 180 degrees for the alternating current power cycle. This means controlling the voltage phase difference and the current phase difference of each phase to be 90 degrees in the cycle of the voltage and the current. The same applies to the case being more than a four phase. In the case where n is not prime numbers, it can be understood as a combination of polyphase systems in a plurality of prime numbers obtained in factorization.

In any of FIGS. 1 to 4, depending on the configurations of the power conversion unit the smoothing means 2 uses capacitive means connected in parallel with the output of the direct current power source 1 if it is a voltage type, and inductive means connected in series between the direct current power source 1 and the power conversion unit 3 if it is a current type.

As for the above-described capacitive means, for example, a capacitor can be cited. If adapted for service conditions such as use voltage, ripple voltage, ripple current, equivalent series resistance ESR, permissible loss, use condition and the like, no particular limit is placed on the type of the capacitor. For example, film capacitor, laminated ceramic capacitor, tantalum electrolytic capacitor, aluminum electrolytic capacitor and the like or a combination of these capacitors can be used. When capacitors are used as the smoothing means 2, since the minimization of the capacity of the same types of capacitors enhances an equivalent series resistance ESR, it is preferable to use the type of the capacitor in which a dielectric dissipation factor is small and the equivalent series resistance ESR is small at the same electric capacity. Particularly, the film capacitor and the laminated ceramic capacitor, which are small in the dielectric dissipation factor, are preferable.

As for the above-described inductive means, a coil can be cited, and means which is adaptable to service conditions such as use current, ripple voltage, ripple current, equivalent series resistance ESR, permissible loss, use condition and the like is used. Although no particular limit is placed on the type and shape of a magnetic material and the structure of a coil winding, it is preferable to select the magnetic material which is dense in saturation magnetic flux density, for example, to realize downsizing.

Further, the capacitive means and the inductive means can be combined to constitute L type, $\pi$ type, T type and the like.

Further, as the capacitive means, it is possible to use a constitution comprising first storage means connected in parallel with the output of the direct current power source 1, a bi-directional power conversion unit having one terminal thereof connected in parallel with the first storage means, second storage means connected in parallel with the other terminal of this bi-directional power conversion unit, and smoothing control means for controlling a power flow. By enhancing a voltage utilization factor of the second storage means, the first storage means can be sharply made small in capacity, and the whole can be made also small in capacity. Note that the smoothing control means may be constituted by sharing the control means, and this has a merit of realizing downsizing and lower cost. Further, since the synchronization of the switch timing between the bi-direction power conversion unit and the conversion main circuit 5 is made easily, there is a merit of lowering a beet as well as a ripple accompanied by the switching operation of the first storage means.

In the case where a kind of the active filter as described above is provided, the ripple can be further lowered. Further, comparing to the constitution in which the active filter is used as against the conventional inverter, the constitution of the present invention is such that the energy to be processed is small and an instantaneous processing capacity of the bi-directional power conversion unit and the capacity of the storage means can be sharply made small in capacity, and therefore, it is possible to realize downsizing and low cost. Further, since the power processed by the bi-directional power conversion unit for the power of the whole power unit becomes extremely smaller than that of the conventional constitution, there is a merit of improving conversion efficiency. Further, if the ripple of the first storage portion, particularly the ripple voltage of the first storage portion is detected and the power flow of the bi-directional power conversion unit is controlled so as to make the detected ripple voltage small, a pulsation of the power can be absorbed simply and reliably by the second storage portion and, therefore, there is a merit of making the first storage portion small in capacity. Further, if the lower harmonic of the output voltage and/or the output current of the power conversion unit are detected and the bi-directional power conversion unit is controlled so that the ripple of the first storage portion becomes small in response to the harmonic power component generated by the lower harmonic, a specific ripple can be effectively absorbed by the second storage means, thereby making the first storage portion small in capacity. The lower the order of a lower harmonic is, the higher the effect of ripple suppression becomes. The lower harmonic may preferably be ten order or less, more preferably five order or less.

As for the polyphase load 4 and the single phase loads 7a and 7b, various loads such as a resistance load, a motor load, and a system or a combination of these loads can be adopted. In the case of the polyphase load 4, the impedance or the voltage of each phase does not always need to be identical, and a different type thereof can be used. Further, even if a power factor of each phase is different, the advantages of the present invention can be obtained. However, the power factor of each phase is preferable to be uniform, and is much preferable to be identical. When the load is the system, the phase difference between the voltage and the current is preferably controlled so as to be always identical at each phase.

The embodiments of the present invention will be described below.

(First Embodiment)

Figure 5:
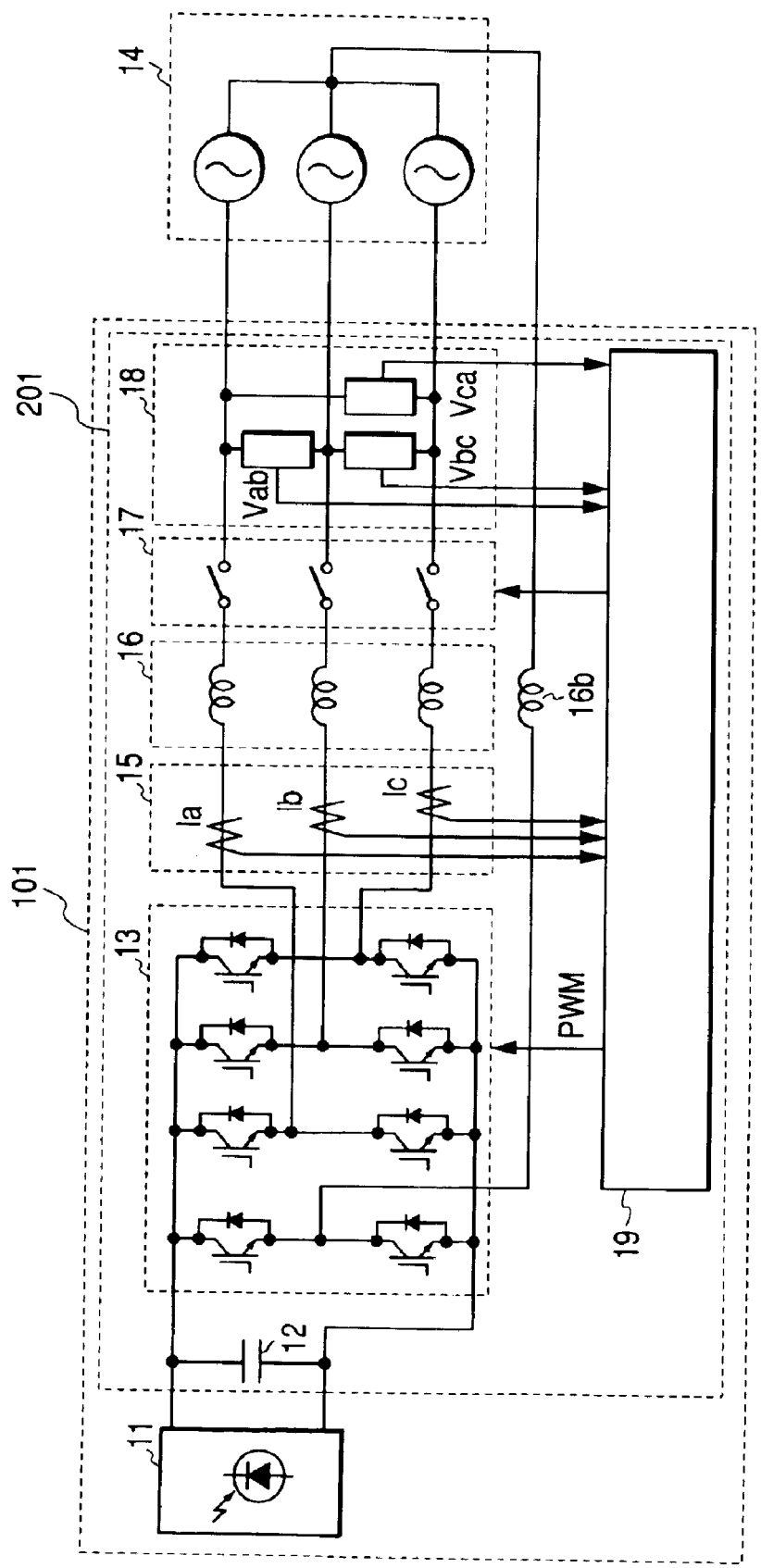
FIG. 5 is a view showing a first embodiment of the present invention.

FIG. 5 is a view showing a first embodiment of the present invention.

A power unit 101 is constituted by a solar cell 11 and a power converter 201 connected to this solar cell 11. The power converter 201 comprises smoothing capacitor 12 connected in parallel with the output of the solar cell 11, a switching circuit 13 for converting a direct current power generated by the solar cell 11 into an three phase alternating current power, and a linkage reactor 16 and a neutral wire reactor 16b for smoothing the current, and outputs the three-phase alternating current power to a three-phase system 14 of a three phase four wire type through an opening and closing means 17. This is a so-called system-tie photovoltaic power generation system comprising the solar cell and a system-tie inverter. Further, this power generation system comprises current detection means 15 for detecting the currents Ia, Ib and Ic of each phase, voltage detection means 18 for detecting the voltages Vab, Vbc and Vca among wires of each system, and each detected signal is outputted to control means 19.

The control means 19 monitors the magnitude and the frequency of the voltages Vab, Vbc and Vca among the wires of each system, and stops the switching circuit 13 when the magnitude and the frequency are outside the predetermined range, and at the same time, closes the opening and closing means 17. At the normal time, a current control is made so that each phase current Ia, Ib and Ic grows into the predetermined magnitude, and a duty of PWM drive signal to the switching circuit 13 is adjusted. The control means for performing such a current control is high in controllability, and is suitable for the system-tie inverter.

The opening and closing means 17 having a mechanical operate contact in the case of the system-tie system is used in general, and for example, a magnet contactor or a relay is used.

The voltage detection means 18 may be anything if capable of detecting the magnitude and frequency (or phase) of the voltage generally required as the system-tie inverter, and no other limit is particularly placed on the same. It may be the means for detecting the magnitude and frequency (or phase) of the voltage separately. In this case, needless to mention, it can serve also as the detection means.

Although the current detection means 15 is applicable to a hole sensor system and a shunt resistance system routinely used in the system-tie inverter, it is not limited to this. In such a system-tie inverter, usually an output command value is generated so that the output from the solar cell 11 becomes maximum by a MPPT control.

In the above described-constitution, the control means 19 finds a phase voltage from the line voltages Vab, Vbc and Vca of the system by a delta star conversion. At the normal time, a current reference signal of each phase, which outputs the same phase current as each phase voltage, is generated. Further, by applying a factor inversely proportional to the magnitude of the voltage of each phase to the output command value, the magnitude of the current command value of each phase is calculated. A current target waveform of each phase is generated by multiplying the current reference signal by the current command value of each phase.

By constituting the present embodiment as described above, the same power is outputted to each phase at a power factor 1. In this way, the whole of the phase difference of the power waveform of each phase of the three phases is matched to 120 degrees dividing the cycle of the power waveform into three equal portions, and at the same time, the whole of the power value of each phase can be controlled to be identical, and the total of the instantaneous power to each phase can be made approximately constant even when the system voltage is unbalanced. The instantaneous power difference between the input power and the output power becomes approximately zero, and by making the energy to be processed minimum, the electrolytic capacity of the smoothing capacitor 12 can be made small in capacity.

Further, if the current reference signal is generated such that the phase difference between the voltage and the current of each phase becomes identical, and at the same time, an apparent power is controlled to become identical, the same effect can be obtained. Hence, when a phase advancing reactive power control is made, the control may be performed as described above.

Note that the detection of the phase voltage is not limited to the above. For example, the present embodiment may be constituted such that the capacitor is star-connected to the wire of each phase, and the voltage at both ends of the capacitor to each phase from the inter-connecting point of the capacitor is detected.

(Second Embodiment)

Figure 6:
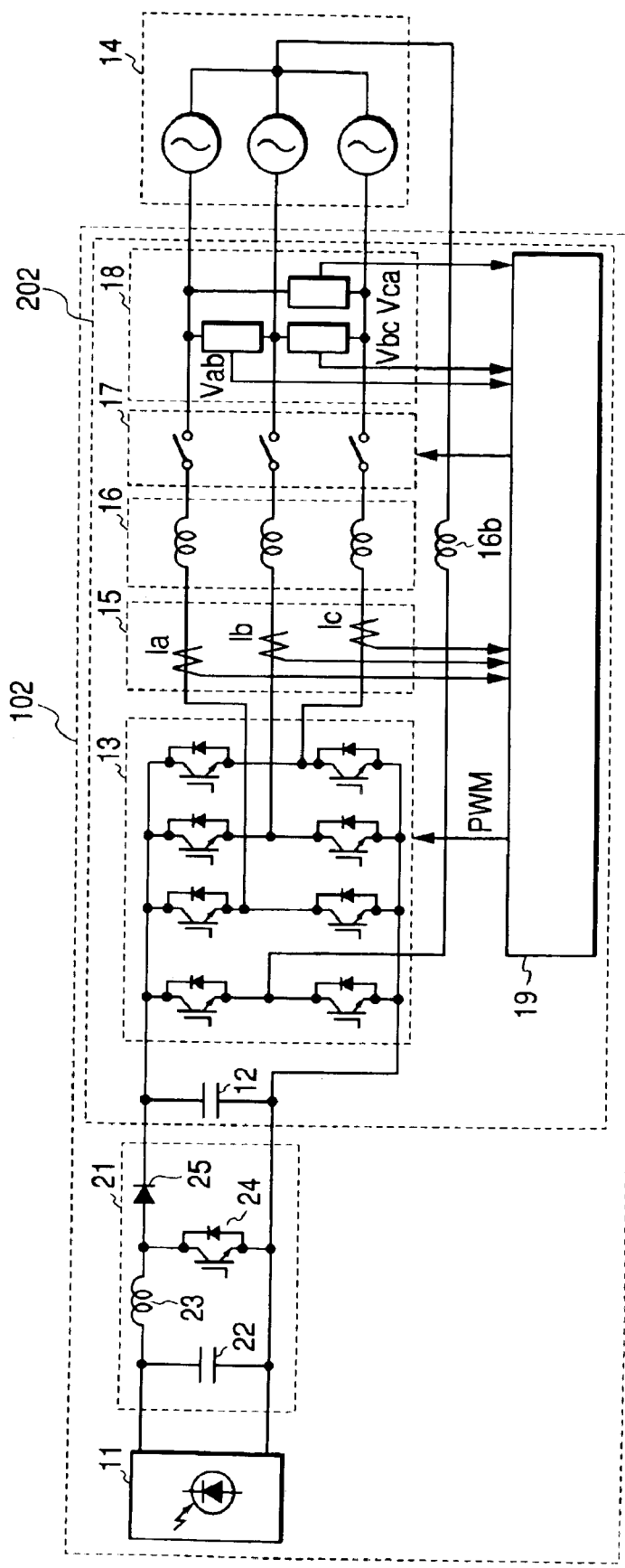
FIG. 6 is a view showing a second embodiment of the present invention.

FIG. 6 is a view showing a second embodiment of the present invention, and has the same constitution as FIG. 5 showing the first embodiment for the most part. Those attached with the same reference numerals denote the same members. This second embodiment is different from the first embodiment in that a DC/DC converter 21 is located between a solar cell 11 and a smoothing capacitor 12. Reference numeral 202 denote a power converter and reference numeral 102 a power unit.

The DC/DC converter 21, as shown in FIG. 6, connects a solar cell 11 and smoothing capacitor 22 in parallel and receives the direct current power of the solar cell 11, and at the same time, constitutes a so-called boosting chopper circuit for boosting the direct current voltage by a boosting coil 23, switching means 24 and a diode 25 for use of protecting a reverse current, and boosts the direct current voltage from the solar cell 11 to a desired voltage so as to be outputted to the smoothing capacitor 12. Since the smoothing capacitor 22 may simply bear only the high frequency component accompanied by the switching operation of the DC/DC converter 21, a capacitor which is small in capacity can be selected.

By inserting the DC/DC converter 21 in this way, the voltage necessary for the system-tie inverter is obtained by the DC/DC converter 21 even when the voltage of the solar cell 11 is low, and therefore, there is a merit of the applicable range thereof becoming wider.

The switching control of the DC/DC converter 21 may be separately provided from the control means 19. In this case, there is a merit of the DC/DC converter 21 being provided at a location distant from the control means 19. Further, if the switching control of the DC/DC converter 21 is shared with the control means 19, not only downsizing and low cost can be easily realized, but also the synchronization of the switching timing of the DC/DC converter 21 and the switching circuit 13 can be easily made. Hence, there is a merit of being able to realize the reduction of the beet as well as the reduction of the ripple accompanied by the switching operation of the smoothing capacitor 12.

(Third Embodiment)

Figure 7:
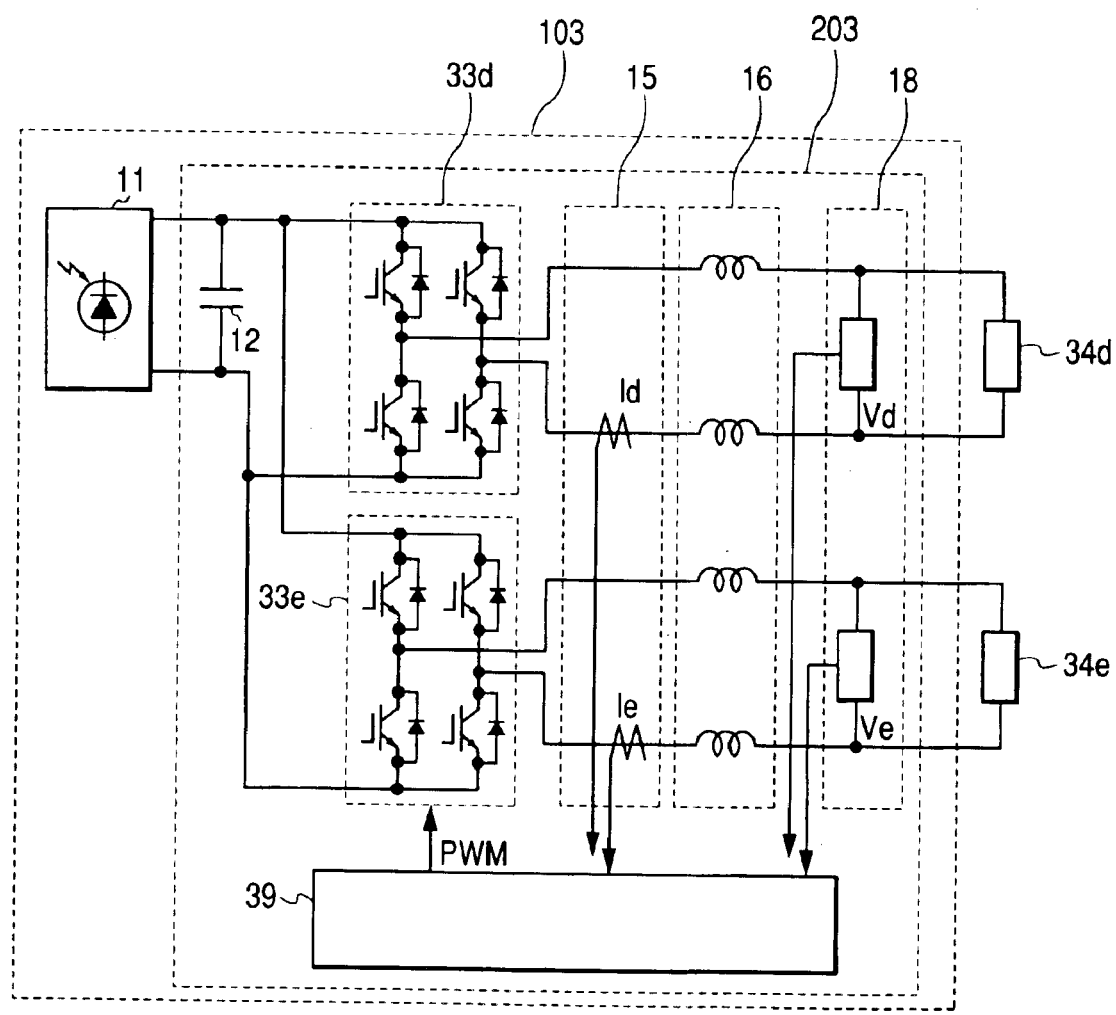
FIG. 7 is a view showing a third embodiment of the present invention.

FIG. 7 is a view showing a third embodiment of the present invention, and reference numerals same as FIG. 5 denote the same members. Reference numeral 203 denotes a power converter.

The point in which a power unit 103 of the present embodiment is sharply different from the first embodiment is that the power unit comprises two single-phase inverters, which output to single-phase resistance loads 34d and 34e, respectively. The input of each single-phase inverter uses a common smoothing capacitor 12, and is converted into a single-phase alternating current by single-phase bridges 33d and 33e respectively, and outputs a smooth current to the resistance loads 34d and 34e respectively by a linkage reactor 16. The output currents Id and Ie of each single-phase inverter are detected by current detection means 15, and the output voltages Vd and Ve applied to each resistance loads 34d and 34e are detected by voltage detection means 18, and both the output currents and the output voltages are outputted to control means 39.

The control means 39 generates a first sine-shaped reference signal and a second sine-shaped reference signal with a phase difference of 90 degrees internally provided. Each single-phase inverter calculates a modulating signal by multiplying the reference signal by an output command value and, by comparing a product thereof to a chopping wave signal which is a carrier signal, generates a PWM signal so as to drive a single-phase bridge 33. The first reference signal is constituted so as to be used for driving the single-phase bridge 33d, and the second reference signal is constituted so as to be used for driving the single-phase bridge 33e. Here, the output power of each phase is calculated from the output currents Id and Ie and the output voltages Vd and Ve of each single-phase inverter. Then, the output command value of each phase is adjusted, so that the power value of the output power of each phase is matched, the output command value of the output power having a larger value is made smaller, and the output command value of the output power having a smaller value is made larger.

By constituting the present embodiment in such way, the sine-wave voltage and current having a phase difference of 90 degrees are supplied to the two resistance loads 34d and 34e. At this time, the power of each resistance loads 34d and 34e becomes an alternating current component of the frequency two times the voltage and the current, while the phase difference of the power of each resistance loads 34d and 34e becomes 180 degrees dividing the cycle of this power into two equal portions. Further, since the power at each resistance loads 34d and 34e is controlled to be identical, the total of the instantaneous power of two each resistance loads 34d and 34e becomes a constant value as evidenced by $(\sin\theta)^2+(\cos\theta)^2=1$, and the total of the input power of each single-phase inverter becomes constant also except for switching components. In this way, since the difference of the instantaneous power hardly exists between the input power and the output power, the electrolytic capacity of the smoothing capacitor 12 can be made sufficiently small.

Note that, while the present embodiment is constituted such that the power values of the output power are matched each other, the conversion efficiency of each single-phase inverter is prepared in advance as a data according to the operating condition of the output voltage, the output current and the like, and instead of the output power, the input power of each single phase inverter is calculated by dividing the output power by the conversion efficiency corresponding to the operating condition, and this input power may be controlled so as to be matched each other. Even when different resistance loads are used, a power error arising from the difference in the conversion efficiency can be approximately compensated, and the total of the input power of each single-phase inverter can be made constant except for switching components. Even when circuit systems and component parts are different, since the compensation using the conversion efficiency can make the power error small, a preferable result can be obtained.

Further, the present embodiment may be constituted such that, instead of detecting the output power, the input power of each single-phase inverter is detected so as to match each other. For example, the present embodiment can be constituted such that each current of the input portion of the each single-phase bridge is detected so that the average value of each input current can be matched each other.

Further, the present embodiment is not limited to the above, but even when a linkage output is made to a two-phase system having a voltage phase difference of 90 degrees, the present invention can be applied. In this case, the above-described two-phase output to a three-phase system is possible through a Scott connection transformer, a modified Woodbridge connection transformer and the like.

(Fourth Embodiment)

Here, a fourth embodiment will be described below. Although the fourth embodiment adopts the constitution same as FIG. 5 in which the first embodiment is shown, the constitution regarding the current control method of the control means 19, more specifically the generation of the current command value is different.

First, the case where a phase voltage of one phase only is different from among three phases is considered.

Where the voltage of the C phase is different from other two phases from among the three phases (A phase, B phase and C phase), the instantaneous values va, vb and vc of each phase voltage can be represented by the following expressions:

$$va = Vo \times \sin(\theta)$$

$$vb = Vo \times \sin(\theta + 2\pi/3)$$

$$vc = Vo \times k1 \times \sin(\theta + 4\pi/3)$$

provided that $\theta = 2\pi \times f \times t$ (f is a frequency of the three-phase system and t is a time).

Vo is an amplitude of the reference phase voltages va and vb (here, it is constant), and k1 is a factor for representing the amplitude of the phase voltage vc by using the above-described Vo, and is represented as follows.

$$k1 = (C \text{ phase voltage amplitude value})/(A \text{ phase voltage amplitude value } Vo)$$

Here, $$k2=(k1-1)/(2\times k1+1).$$

By using the above factor K2, the instantaneous values ia, ib and ic of each phase line current are controlled by adjusting the C phase component current as follows.

$$ia=Io\times(\sin(\theta)+k2\times\sin(\theta+4\pi/3))$$

$$ib=Io\times(\sin(\theta+2\pi/3)+k2\times\sin(\theta+4\pi/3))$$

$$ic=Io\times((1-2\times k2)\times\sin(\theta+4\pi/3))$$

That is, from the C phase current, the C phase component is adjusted so as to be reduced approximately by $2\times k2$, and the adjusted portion $2\times k2$ of the C phase component is, instead, equally distributed to other two line currents. Then, the A phase line current and the B phase line current increase the C phase component approximately by k2.

Since the instantaneous powers pa, pb and pc of the three phases are:

$$pa=va\times ia$$

$$pb=vb\times ib$$

$$pc=vc\times ic,$$

the total value psum of the instantaneous power of the three phases is represented by the following expression:

$$psum = pa + pb + pc$$
$$= va \times ia + vb \times ib + vc \times ic$$

When each phase voltage and each phase line current are substituted by the above expressions, the following expression is derived:

$$psum=3/2\times Vo\times Io+Vo\times Io\times\sin^2(\theta+4\pi/3)\times[-k2\times(2\times k1+1)+k1-1]$$

Here, the first item of the above expression is a constant number. Further, as for the second item, since it is $k2=(k1-1)/(2\times k1+1)$, it becomes $[-k2\times(2\times k1+1)+k1-1]=0$. Hence, the second item of the above expression becomes zero, and the total value psum of the instantaneous power of the three phases becomes as follows:

$$psum=3/2\times Vo\times Io \text{ (steady value)}$$

and the pulsation of the output power is not generated. In this way, the instantaneous power difference between the input power and the output power becomes approximately zero, and by making the energy to be processed minimum, the electrolytic capacity of the smoothing capacitor 12 can be made small.

As one example, a calculation is made on the pulsation of the output power where the phase voltages of the three phases are 115V, 115V and 117V, respectively.

Now, an output power ripple factor shall be defined by the following expression:

Output power ripple factor=(peak to peak value of *psum*)/(average value of *psum*)

With regard to the conventional line current of the three-phases, when the current having the same magnitude and the same power factor is allowed to flow, the output power ripple factor calculated is 1.327%. Whereas, based on the present embodiment, when adjustment and control are made as:

$$k1=117/115=1.01739, k2=0.00537, (1-2\times k2)=0.98854,$$

the output ripple factor is calculated to be 0.000%. In this way, when the phase voltage of one phase is different, the current of the phase of an adjusting object, in which the reference phase and an effective power become the same, is adjusted and, at the same time, a current adjustment is made for the two phases in which the current of the reverse code of the adjusted current is distributed to the current of the reference phase and the current of other phases so that the reactive power is counteracted, thereby it is understood that the time jitter of the total value psum of the instantaneous output power is nicely controlled, and the pulsation of the input power is also controlled. At the time of the above-described current distribution, the current adjustment is made by taking into consideration the fluctuation of an effective power at a current distribution destination by the current distribution. In this way, the energy to be processed is made minimum, thereby enabling the electrolytic capacity of the smoothing capacitor 12 to be made small.

Next, considering the case where any one of the phase voltages of three phases (A phase, B phase and C phase) is different, the instantaneous values va, vb and vc of each phase voltage are represented by the following expressions:

$$va=Vo\times\sin(\theta)$$

$$vb=Vo\times k1b\times\sin(\theta+2\pi/3)$$

$$vc=Vo\times k1c\times\sin(\theta+4\pi/3)$$

provided that $\theta=2\pi\times f\times t$ (f is a frequency of the three-phase system, t is a time)

Vo is the amplitude of the reference phase voltage va (here, it is constant), and k1*b* and k1*c* are the factors for representing the amplitude of the phase voltages vb and vc by using the above-described Vo, and are represented as follows:

k1*b*=(B phase voltage amplitude value)/(A phase voltage amplitude value Vo)

k1*c*=(C phase voltage amplitude value)/(A phase voltage amplitude value Vo)

Here, $$k2b=(k1b-1)/(2\times k1b+1)$$

$$k2c=(k1c-1)/(2\times k1c+1).$$

By using the above-describe factors k2*b* and k2*c*, the instantaneous values ia, ib and ic of each phase line current are controlled as follows by adjusting the B phase component current and the C phase component current:

$$ia=Io\times(\sin(\theta)+k2b\times\sin(\theta+2\pi/3)+k2c\times\sin(\theta+4\pi/3))$$

$$ib=Io\times((1-2\times k2b)\times\sin(\theta+2\pi/3)+k2c\times\sin(\theta+4\pi/3))$$

$$ic=Io\times(k2b\times\sin(\theta+2\pi/3)+(1-2\times k2c)\times\sin(\theta+4\pi/3)$$

That is, from the B phase line current, the B phase component is adjusted so as to be reduced approximately by $2\times k2b$, and the adjusted portion $2\times k2b$ of the B phase component is, instead, equally distributed to other two line currents, so that the A phase line current and the C phase line current increase the B phase component approximately by k2*b*. Further, from the C phase line current, the C phase component is adjusted so as to be reduced approximately by $2 \times k2c$, and the adjusted portion $2 \times k2c$ of the C phase component is, instead, equally distributed to two other line currents, so that the A phase line current and the B phase line current increase the C phase component approximately by $k2c$.

As one example, a calculation is made on the pulsation of the output power in which the phase voltages of the three phases are 117V, 115V, 119V, respectively.

With regard to the conventional line current of the three-phases, when the current having the same magnitude and the same power factor is allowed to flow, the output power ripple factor calculated is 1.974%. Whereas, based on the present embodiment, when adjustment and control are made as:

$$k1b=115/117=0.98291, k2b=-0.00576, (1-2 \times k2b)=1.01153$$

$$k1c=119/117=1.01709, k2c=0.00563, (1-2 \times k2c)=0.98873,$$

the output power ripple factor calculated is 0.013%. In this way, even when any phase voltage of the three phases is different, the current of the phase of the adjusting object in which the reference phase and the effective power become the same is adjusted and, at the same time, the current adjustment is made for the two phases, in which the current of the reverse code of the adjusted current is distributed to the reference phase and other phases so that the reactive power is counteracted, thereby it is understood that the time jitter of the total value psum of the instantaneous output power is nicely controlled and the pulsation of the input power is also controlled. At the time of the above-described current distribution, the current adjustment is made by taking into consideration the fluctuation of the effective power at the current distribution destination by the current distribution. In this way, the energy to be processed is made minimum, thereby enabling the electrolytic capacity of the smoothing capacitor 12 to be made small.

The reference phase voltage, whichever phase voltage it is, can further lower the pulsation of the output power. Further, when Vo is taken based on the phase voltage which is the intermediate voltage value among the phase voltages of the three phases, the pulsation of the output power can be extremely lowered, which is preferable.

Figure 8:
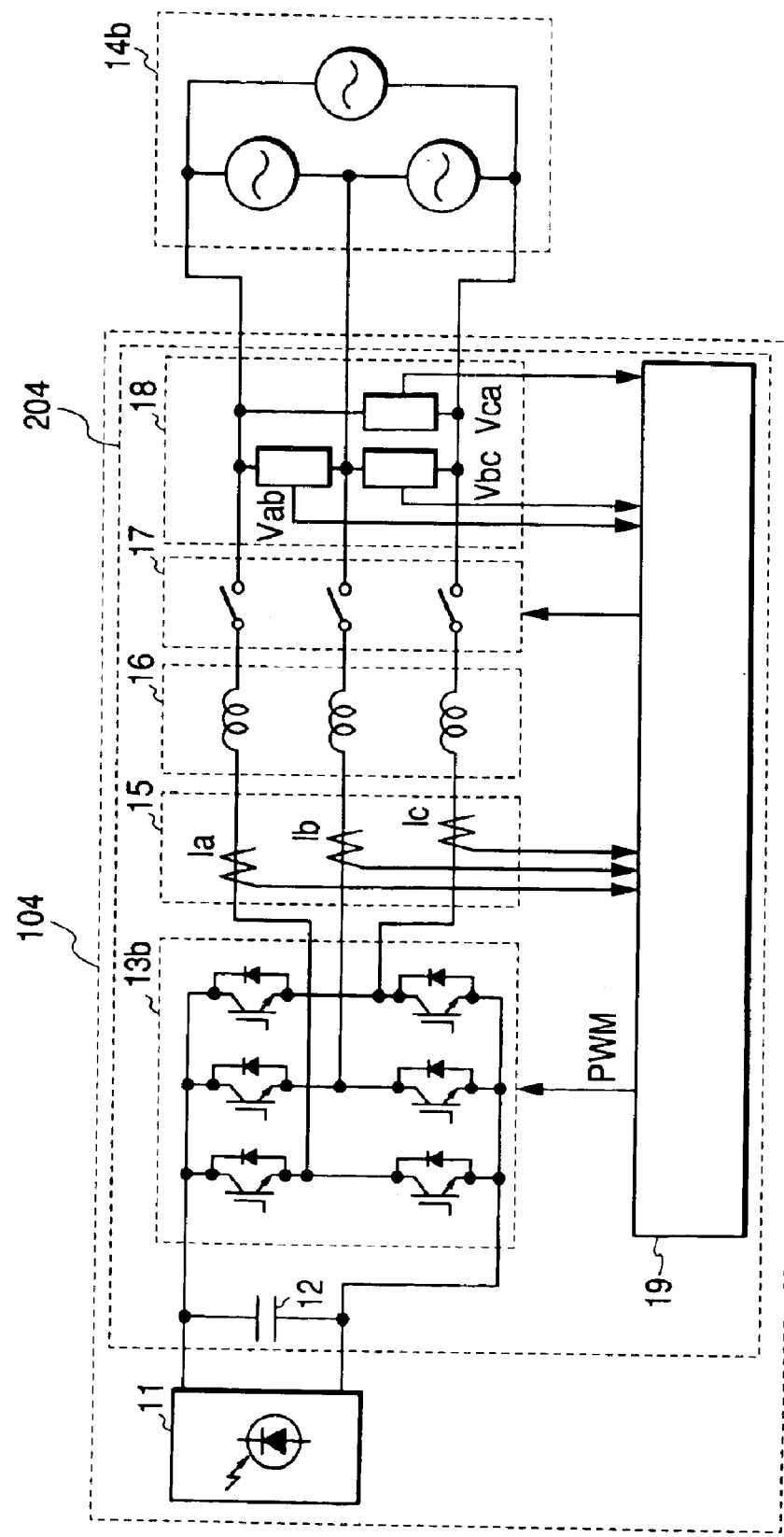
FIG. 8 is a view showing another embodiment of a power unit according to the present invention.
Figure 9:
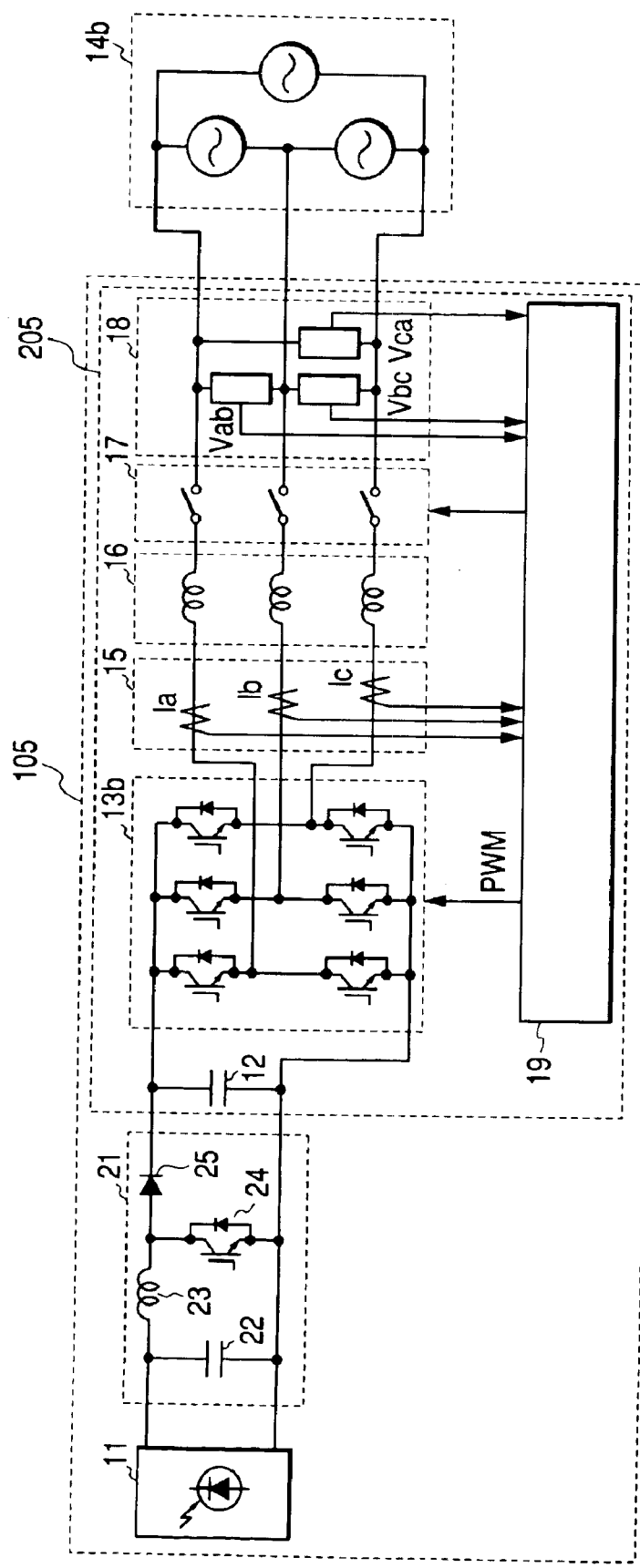
FIG. 9 is a view showing another embodiment of a power unit according to the present invention.

Note that, in the present embodiment, since the current flowing into the intermediate line becomes zero, as shown in FIG. 8, a power unit 104 can be constituted so as to output to a three phase system 14b of the three phase three line type. Further, a power unit 105 comprising the DC/DC converter 21 as shown in FIG. 9 can be constituted so as to output to the three phase system 14b of the three phase three line type. Note that reference numeral 204 in FIG. 8 denotes a power converter, reference numeral 13b in FIG. 8 a switching circuit, reference numeral 205 in FIG. 9 a power converter. Further, in FIGS. 8 and 9, the reference numerals same as FIGS. 5 and 6 denote the same members.

(Fifth Embodiment)

Here, a fifth embodiment will be described below. Although the fifth embodiment is same as the fourth embodiment and adopts the constitution same as FIG. 5 in which the first embodiment is shown, the constitution regarding the current control method of the control means 19, more specifically, the generation of the current command value is different.

Considering the case where any of the phase voltages of the three phases (A phase, B phase and C phase) is different, the instantaneous values va, vb and vc of each phase voltage can be represented by the following expressions:

$$va = Vo \times \sin(\theta)$$

$$vb = Vo \times k1b \times \sin(\theta + 2\pi/3)$$

$$vc = Vo \times k1c \times \sin(\theta + 4\pi/3)$$

provided that $\theta = 2\pi \times f \times t$ (f is a frequency of the three-phase system and t is a time).

Vo is an amplitude of the reference phase voltage va (here, it is constant) and k1b and k1c are factors for representing the amplitude of the phase voltages vb and vc by using the above-described Vo, and are represented as follows.

$k1b = (B$ phase voltage amplitude value$)/(A$ phase voltage amplitude value $Vo)$ $k1c = (C$ phase voltage amplitude value$)/(A$ phase voltage amplitude value $Vo)$.

Here, $$k2b = (k1b-1)/(2 \times k1b+1)$$

$$k2c = (k1c-1)/(2 \times k1c+1)$$

and by using the above-described factors k2b and k2c as well as k1b and k1c, the present invention controls the instantaneous values ia, ib and ic of each phase line current by adjusting the B phase component current and the C phase component current as follows:

$$ia = Io \times \{(\sin(\theta) + k2b \times (k1c/(1+k1c)) \times \sin(\theta + 2\pi/3) + k2c \times (k1b/(1+k1b)) \times \sin(\theta + 4\pi/3))$$

$$ib = Io \times \{(1 - 2 \times k2b) \times \sin(\theta + 2\pi/3) + k2c \times (1/(1+k1b)) \times \sin(\theta + 4\pi/3)\}$$

$$ic = Io \times \{(k2b \times (1/(1+k1c)) \times \sin(\theta + 2\pi/3) + (1 - 2 \times k2c) \times \sin(\theta + 4\pi/3)\}$$

That is, from the B phase line current, the B phase component is adjusted so as to be reduced approximately by $2 \times k2b$, and the adjusted portion $2 \times k2b$ of the B phase component is, instead, distributed to other two line currents in inverse proportion to the magnitude of the phase voltage, so that the B phase component is increased for the A phase line current approximately by $k2b \times (k1c/(1+k1c))$ and the B phase component is increased for the C phase line current approximately by $k2b \times (1/(1+k1c))$. Further, from the C phase line current, the C phase component is adjusted so as to be reduced approximately by $2 \times k2c$, and the adjusted portion $2 \times k2c$ of the C phase component is, instead, distributed to two other line currents in reverse proportion to the magnitude of the phase voltage, so that the C phase component is increased for the A phase line current approximately by $k2c \times (k1b/(1+k1b))$ and the C phase component is increased for the B phase line current approximately by $k2c \times (1/(1+k1b))$.

As one example, a calculation is made on the pulsation of the output power where the phase voltages of the three phases are 117V, 115V and 119V, respectively.

With regard to the conventional line current of the three-phases, when the current of the same magnitude and the same power factor is allowed to flow, the output power ripple factor calculated is 1.974%. Whereas, based on the present embodiment, when adjustment and control are made as:

$k1b$=115/117=0.98291, $k2b$=−0.00576, (1−2×$k2b$)=1.01153

$k1c$=119/117=1.01709, $k2c$=0.00563, (1−2×$k2c$)=0.98873

$k2b$×($k1c$/(1+$k1c$))=−0.00571, $k2b$×(1/(1+$k1c$))=−0.00581

$k2c$×($k1c$/(1+$k1b$))=0.00559, $k2c$×(1/(1+$k1b$))=0.00568 the output ripple factor calculated is 0.003%. In this way, even when any phase voltage of the three phases is different, the current of the phase of the adjusting object in which the reference phase and the effective power become the same is adjusted and, at the same time, the current adjustment is made for the two phases, in which the current of the reverse code of the adjusted current is distributed to the current of the reference phase and the current of other phases so that the reactive power is counteracted, thereby it is understood that the time jitter of the total value psum of the instantaneous output power is nicely controlled, and the pulsation of the input power is also controlled. At the time of the above-described current distribution, the current adjustment is made by taking into consideration the fluctuation of the effective power at the current distribution destination by the current distribution. In this way, the energy to be processed is made minimum, thereby enabling the electrolytic capacity of the smoothing capacitor 12 to be made small. Further, though the present embodiment has the amount of calculations slightly greater than the fourth embodiment, it has an output power ripple factor smaller than the fourth embodiment and the pulsation of the output power is more nicely controlled, which is preferable.

The reference phase voltage, whichever phase voltage it is, can further lower the pulsation of the output power. Further, when the phase voltage which is the intermediate voltage value among the phase voltages of the three phases is taken as a reference, the pulsation of the output power can be extremely lowered, which is preferable.

Note that, in the present embodiment, since the current flowing into the intermediate line becomes zero, as shown in FIG. 8, a power unit 104 can be constituted so as to output to a three phase system 14b of the three phase three line type. Further, a power unit 105 comprising a DC/DC converter 21 as shown in FIG. 9 can be constituted so as to output to the three phase system 14b of the three phase three line type.

(Sixth Embodiment)

Here, a six embodiment will be described below. Although the six embodiment is same as the fourth and fifth embodiments and adopts the constitution same as FIG. 5 in which the first embodiment is shown, the constitution regarding the current control method of the control means 19, more specifically, the generation of the current command value is different.

Considering the case where any one of the phase voltages of the three phases (A phase, B phase and C phase) is different, the instantaneous values va, vb and vc of each phase voltage can be represented by the following expressions:

$va = Vo \times \sin(\theta)$ $vb = Vo \times k1b \times \sin(\theta + 2\pi/3)$ $vc = Vo \times k1c \times \sin(\theta + 4\pi/3)$ provided that $\theta = 2\pi \times f \times t$ (f is a frequency of the three-phase system and t is a time).

Vo is an amplitude of the reference phase voltage va (here, it is a constant number), and $k1b$ and $k1c$ are factors for representing the amplitude of the phase voltages vb and vc by using the above-described Vo, and are represented as follows.

$k1b$=(B phase voltage amplitude value)/(A phase voltage amplitude value Vo)

$k1c$=(C phase voltage amplitude value)/(A phase voltage amplitude value Vo)

Here, $k2b = (k1b−1)/(3 \times k1b) = (1−1/k1b)/3$ $k2c = (k1c−1)/(3 \times k1c) = (1−1/k1c)/3$ the present embodiment is different from the fourth and fifth embodiments in that the above-described factors $k2b$ and $k2c$ as well as $k1b$ and $k1c$ are used. The instantaneous values ia, ib and ic are controlled by adjusting the B phase component current and the C phase component current as follows:

$ia = Io \times \{(\sin(\theta) + k2b \times (k1c/(1+k1c)) \times \sin(\theta+2\pi/3) + k2c \times (k1b/(1+k1b)) \times \sin(\theta+4\pi/3)\}$ $ib = Io \times \{(1−2 \times k2b) \times \sin(\theta+2\pi/3) + k2c \times (1/(1+k1b)) \times \sin(\theta+4\pi/3)\}$ $ic = Io \times \{(k2b \times (1/(1+k1c)) \times \sin(\theta+2\pi/3) + (1−2 \times k2c) \times \sin(\theta+4\pi/3)\}$ That is, from the B phase line current, the B phase component is adjusted so as to be reduced approximately by 2×$k2b$, and the adjusted portion 2×$k2b$ of the B phase component is, instead, distributed to other two line currents in inverse proportion to the magnitude of the phase voltage, so that the B phase component is increased for the A phase line current approximately by $k2b$×($k1c$/(1+$k1c$)) and the B phase component is increased for the C phase line current increase approximately by $k2b$×(1/(1+$k1c$)). Further, from the C phase line current, the C phase component is adjusted so as to be reduced approximately by 2×$k2c$, and the adjusted portion 2×$k2c$ of the C phase component is, instead, distributed to two other line currents in reverse proportion to the magnitude of the phase voltage, so that the C phase component is increased for the A phase line current approximately by $k2c$×($k1b$/(1+$k1b$)) and the C phase component is increased for the B phase line current approximately by $k2c$×(1/(1+$k1b$)). In other words, though the magnitude of the adjusted current 2×$k2b$ is different from the fifth embodiment, the distribution method of the reverse code of the adjusted current is the same.

As one example, a calculation is made on the pulsation of the output power where the phase voltages of the three phases are 117V, 115V and 119V, respectively.

With regard to the conventional line current of the three-phases, when the current of the same magnitude and the same power factor is allowed to flow, the output power ripple factor calculated is 1.974%. Whereas, based on the present embodiment, when adjustment and control are made as:

$k1b$=115/117=0.98291, $k2b$=−0.00580, (1−2×$k2b$)=1.01159

$k1c$=119/117=1.01709, $k2c$=0.00560, (1−2×$k2c$)=0.98880

$k2b$×($k1c$/(1+$k1c$))=−0.00575, $k2b$×(1/(1+$k1c$))=−0.00585

$k2c$×($k1b$/(1+$k1b$))=0.00555, $k2c$×(1/(1+$k1b$))=0.00565 the output ripple factor calculated is 0.010%. In this way, even when any phase voltage of the three phases is different, the current of the phase of the adjusting object in which the reference phase and the effective power become the same is adjusted and, at the same time, the current adjustment is made for the two phases, in which the current of the reverse code of the adjusted current is distributed to the current of the reference phase and the current of other phases so that the reactive power is counteracted, thereby it is understood that the time jitter of the total value psum of the instantaneous output power is nicely controlled, and the pulsation of the input power is also controlled. At the time of the above-described current distribution, the current adjustment is made by taking into consideration the fluctuation of the effective power at the current distribution destination by the current distribution. In this way, the energy to be processed is made minimum, thereby enabling the electrolytic capacity of the smoothing capacitor 12 to be made small. Further, while sufficiently controlling the pulsation of the power, the present embodiment can reduce the amount of calculations further than the fifth embodiment, thereby making it possible to construct the control means smaller in size and lower in cost, which is preferable.

Further, similarly as the fifth embodiment, the current distribution can be made also equally to the line currents of the two phases, and in such a constitution, the amount of calculations can be further reduced, thereby making it possible to construct the control means smaller in size and lower in cost, which is preferable. The power ripple factor calculated in this case is 0.019% and it is understood that the pulsation of the power can be sufficiently controlled.

The reference phase voltage, whichever phase voltage it is, can further lower the pulsation of the output power. Further, when the phase voltage which is the intermediate voltage value among the phase voltages of the three phases is taken as a reference, the pulsation of the output power can be extremely lowered, which is preferable.

Note that, in the present embodiment, since the current flowing into the intermediate line becomes zero, as shown in FIG. 8, a power unit 104 can be constituted so as to output to a three phase system 14b of the three phase three line type. Further, a power unit 105 comprising a DC/DC converter 21 as shown in FIG. 9 can be constituted so as to output to the three phase system 14b of the three phase three line type.

Further, as against the current adjustment methods of the fourth, fifth and six embodiments, even when each phase current is phase-adjusted further equally to an advancing or lagging phase, an execution value of the alternating component of the total psum of the instantaneous power of the three phases does not change. Hence, bulk adjustment and combination of the current phases can maintain the control of the pulsation of the output power, and can control the total of the effective power and the total of the reactive power.

Further, the present embodiment is not limited to the above, but can be modified variously. For example, it can be modified to the expression in which the phase voltage is converted into a line to line voltage by a Y to Δ conversion.

A current expression satisfying the condition in which a time differential of the total psum of the instantaneous power of the three phases becomes zero or almost zero is derived and, based on this, the current may be controlled, and the pulsation of the output power can be controlled to be zero or to the vicinity of zero. Further, the current expression satisfying the above described condition as well as the condition in which the total of the instantaneous values of the line currents of the three phases become zero or almost zero is derived and, based on this, the current may be controlled, and the pulsation of the output power can be controlled to be zero or almost to the vicinity of zero. At the same time, the current of the intermediate line can be controlled to be zero or to the vicinity of zero. Further, where the currents of the three phases are expressed by the following expressions as the condition, in which the total of the instantaneous values of the line currents of the three phases become zero:

$$i1 = I11 \times \sin(\theta) + I12 \times \sin(\theta + 2\pi/3) + I13 \times \sin(\theta + 4\pi/3)$$

$$i2 = I21 \times \sin(\theta) + I22 \times \sin(\theta + 2\pi/3) + I23 \times \sin(\theta + 4\pi/3)$$

$$i3 = I31 \times \sin(\theta) + I32 \times \sin(\theta + 2\pi/3) + I33 \times \sin(\theta + 4\pi/3)$$

provided that $\theta = 2\pi \times f \times t$ (f is a frequency of the three-phase system and t is a time) the following expression:

$$I11 + I21 + I31 = I12 + I22 + I32 = I13 + I23 + I33 = A$$

provided that A is an arbitrary constant number may be satisfied as a condition. In the case where the condition in which the total of the instantaneous values of the line currents of the three phases become zero is given priority and, on that basis, the current is controlled toward the current expression in which the time differential of the total psum of the instantaneous power of the three phases become zero or almost zero, since the current flowing into the intermediate line becomes zero, the three phase three line type can be also realized. The preferred condition for the current at this time exits in the following vicinity. Based on the state in which the line currents of three phases are in phase with the alternating currents of three phases, and in relation to the reference phase among the three phases as well as one phase among the remaining two phases, the line current of the other phase is considered in such a manner that the phase voltages of the other phase and the reference phase are in reverse proportion to the line currents of the other phase and the reference phase. The line currents of the other phases are also similarly considered. In this case, each power of the three phases has the frequency two times the alternating system, and the alternating current components thereof have the same size and the phases thereof are spaced at equal intervals. The total value of the power of the three phases is constant time-wise.

Further, as a way of the adjustment of the current component of the same phase as the phase voltage of one phase, when the size having one thirds the size of the value, in which the size of the current value of the other phase is subtracted from the size of the current value of the reference phase, is taken as a first adjustment value, the adjustment is made such that the line current of each phase is added with the current which is in phase with the phase voltage of the other phase and becomes the first adjustment value in size. Further, the adjustment of the current component which is in phase with the phase voltage of the other phase is also similarly performed. If the expression of the instantaneous power at this time is derived, it is understood that the fluctuation of the instantaneous power can be approximated to almost zero since the ratio of the phase voltage is approximately 1.

For example, in the case where magnitude of two voltage of three phase voltage is V, magnitude of the remainder voltage is $V \times (1 + \Delta V)$ (provided that $|\Delta V| \leq 0.1$), variation component of $$psum = V \times A \times (\Delta V)^2 \times \sin^2\theta / \{3 \times (1 + \Delta V)\}.$$

Therefore, $$\text{power ripple factor} = 2 \times (\Delta V)^2 / \{3 \times (1 + \Delta V)\},$$

and $|\Delta V| \leq 0.1$ provides 0.202% or less of power ripple factor, which clarifies from the formula that variation of the instantaneous power can be well suppressed.

Although the fact that the time differential value of the total psum of the instantaneous power of the three phases is zero is ideal for the downsizing of the smoothing means, in practice, it is preferable that the power ripple factor is ½ or less before applied the control of the present invention, whereby the smoothing means can be well downsized. It is more preferable that the power ripple factor is ⅒ or less before applied the control of the present invention, whereby the smoothing means can be extremely downsized. Further, below 1% in terms of the power ripple factor in the rated power of the power converter or the power unit is preferable. In this way, the smoothing means can be nicely made small in size. More preferably, the power ripple factor is below 0.2% so that the smoothing means can be made extremely small in size.

What is claimed is:

1. A power converter comprising a power conversion unit having an n-phase alternating current output (n is an integer number with $n \geq 2$) connected to a direct current power source, and smoothing means provided between the direct current power source and the power conversion unit, wherein the power conversion unit comprises control means which allows the whole of a phase difference of a power waveform of each phase to be matched to a value dividing a cycle of the power waveform into n-equal portions, and at the same time, the whole of a power value of each phase is controlled to be identical.

2. The power converter according to claim 1, wherein the control means detects an output voltage of each phase and is controlled so as to become a phase current in reverse proportion to the output voltage.

3. The power converter according to claim 1, wherein the smoothing means comprises: a first storage portion connected in parallel with the direct current power source between the direct current power source and the power conversion unit; a bi-directional power conversion unit having one terminal connected in parallel with the first storage portion; a second storage portion connected to the other terminal of the bi-directional power conversion unit; and smoothing control means for controlling a power flow of the bi-directional power conversion unit so that a ripple of the first storage portion becomes small.

4. The power converter according to claim 3, wherein the smoothing control means detects the ripple of the first storage portion and controls the power flow of the bi-directional power conversion unit such that the detected ripple becomes small.

5. The power converter according to claim 3, wherein the smoothing control means detects a lower harmonic of the output voltage and/or the output current of the power conversion unit, and controls the bi-directional power conversion unit such that the ripple of the first storage portion becomes small in accordance with the lower harmonic.

6. The power converter according to claim 1, wherein the power conversion unit outputs alternating currents of two phases in which the voltage and current phase of each phase are different in 90 degrees.

7. The power converter according to claim 1, wherein the control means controls the whole of the phase difference of the output voltage and the output current of each phase of the power conversion unit to be identical.

8. The power converter according to claim 1, wherein each output phase of the power conversion unit is connected to each phase of an n-phase alternating current system of the same number of phases as the power conversion unit, and makes a system-tie output.

9. The power converter according to claim 1, wherein the direct current power source is either a solar cell or a fuel cell.

10. The power converter according to claim 1, wherein the direct current power source comprises a solar cell or a fuel cell and a DC/DC converter for voltage-converting and outputting a direct output from the solar cell or the fuel cell.

11. A power unit comprising a direct current power source and the power converter according to claim 1 connected to the direct current power source.

12. A power converter comprising a power conversion unit which is connected to a direct current power source and outputs a three phase alternating current, and smoothing means provided between the direct current power source and the power conversion unit, comprising: voltage detection means for detecting the voltage of a first phase, a second phase and a third phase of three phases; and control means in which, based on the first phase among the three phases; a second phase component of a second phase line current is increased and decreased to be adjusted in accordance with a phase voltage of the second phase, and the amount of a reverse code of the adjusted portion of the second phase component is increased and decreased to be adjusted by being distributed to the line current of the first phase and the line current of the third phase, and based on the first phase among the three phases, the third phase component of the line current of the third phase is increased and decreased to be adjusted in accordance with the phase current of the third phase, and the amount of the reverse code of the adjusted portion of the third phase component is increased and decreased to be adjusted by being distributed to the line current of the first phase and the line current of the second phase; and at the same time, for the total value psum(t) of an instantaneous power of the three phases:

$$psum(t)=$$

the phase voltage of the first phase×the line current of the first phase+the phase voltage of the second phase×the line current of the second phase+the phase voltage of the third phase×the line current of the third phase the following expression:

$$d(psum)/dt \approx 0$$

is satisfied.

13. The power converter according to claim 12, comprising control means satisfying the following expression:

$$isum(t)=0$$

for the total value isum(t) of instantaneous line currents of the three phases:

$isum(t)$=the first phase line current+the second phase line current+the third phase line current.

14. The power converter according to claim 13, wherein, in case where a voltage v1 of the first phase, a voltage v2 of the second phase and a voltage v3 of the third phase are given by the following expressions:

$$v1 = V1 \times \sin(\theta)$$

$$v2 = V2 \times \sin(\theta + 2\pi/3)$$

$$v3 = V3 \times \sin(\theta + 4\pi/3),$$

and based on the first phase, $$Ga = V2/V1$$

$$Gb = V3/V1$$

the power converter controls the current i1 of the first phase, the current i2 of the second phase and the current i3 of the third phase so as to become the following expressions:

$$i1 = I0 \times (\sin(\theta) + I12 \times \sin(\theta + 2\pi/3) + I13 \times \sin(\theta + 4\pi/3))$$

$$i2 = I0 \times ((1 - 2 \times Ka) \times \sin(\theta + 2\pi/3) + I23 \times \sin(\theta + 4\pi/3))$$

$$i3 = I0 \times (I32 \times \sin(\theta + 2\pi/3) + (1 - 2 \times Kb) \times \sin(\theta + 4\pi/3))$$

$$I12 + I32 = 2 \times Ka$$

$$I13 + I23 = 2 \times Kb$$

(I0 is an arbitrary number)
provided that $$Ka = (V2 - V1)/(2 \times V2 + V1) = (Ga - 1)/(2 \times Ga + 1)$$

$$Kb = (V3 - V1)/(2 \times V3 + V1) = (Gb - 1)/(2 \times Gb + 1).$$

15. The power converter according to claim 13, wherein in case where a voltage v1 of the first phase, a voltage v2 of the second phase and a voltage v3 of the third phase are given by the following expressions:

$$v1 = V1 \times \sin(\theta)$$

$$v2 = V2 \times \sin(\theta + 2\pi/3)$$

$$v3 = V3 \times \sin(\theta + 4\pi/3),$$

and based on the first phase, $$Ga = V2/V1$$

$$Gb = V3/V1$$

the power converter controls the current i1 of the first phase, the current i2 of the second phase and the current i3 of the third phase so as to become the following expressions:

$$i1 = I0 \times (\sin(\theta) + I12 \times \sin(\theta + 2\pi/3) + I13 \times \sin(\theta + 4\pi/3))$$

$$i2 = I0 \times ((1 - 2 \times Ka) \times \sin(\theta + 2\pi/3) + I23 \times \sin(\theta + 4\pi/3))$$

$$i3 = I0 \times (I32 \times \sin(\theta + 2\pi/3) + (1 - 2 \times Kb) \times \sin(\theta + 4\pi/3))$$

$$I12 + I32 = 2 \times Ka$$

$$I13 + I23 = 2 \times Kb$$

(I0 is an arbitrary number)
provided that $$Ka = (V2 - V1)/(3 \times V2) = (Ga - 1)/(3 \times Ga)$$

$$Kb = (V3 - V1)/(3 \times V3) = (Gb - 1)/(3 \times Gb).$$

16. The power converter according to claim 14 or 15, wherein, by way of $$I12 = I32 = Ka$$

$$I13 = I23 = Kb,$$

the current i of the first phase, the current i2 of the second phase and the current i3 of the third phase are controlled so as to become the following expressions:

$$i1 = I0 \times (\sin(\theta) + Ka \times \sin(\theta + 2\pi/3) + Kb \times \sin(\theta + 4\pi/3))$$

$$i2 = I0 \times ((1 - 2 \times Ka) \times \sin(\theta + 2\pi/3) + Kb \times \sin(\theta + 4\pi/3))$$

$$i3 = I0 \times (Ka \times \sin(\theta + 2\pi/3) + (1 - 2 \times Kb) \times \sin(\theta + 4\pi/3)).$$

17. The power converter according to claim 14 or 15, the current i1 of the first phase, the current i2 of the second phase and the current i3 of the third phase are controlled so as to become the following expressions:

$$I12 = 2 \times Ka \times (V3/(V1 + V3)), I32 = 2 \times Ka \times (V1/(V1 + V3)),$$

$$I13 = 2 \times Kb \times (V2/(V1 + V2)), I23 = 2 \times Kb \times (V1/(V1 + V2)).$$

18. The power converter according to claim 12, wherein each phase current is further current-controlled to an advancing or a lagging phase with the same phase.

19. The power converter according to claim 12, wherein a phase having the second largest magnitude of the phase voltage among the three phases is selected as a first reference phase.

20. The power converter according to claim 12, comprising:

a first storage portion in which the smoothing means is connected in parallel with the direct current power source between the direct current power source and the power conversion unit; a bi-directional power conversion unit having one terminal connected in parallel with the first storage portion; a second storage portion connected to the other terminal of the bi-directional power conversion unit; and smoothing control means for controlling a power flow of the bi-directional power conversion unit such that a ripple of the first storage portion becomes small.

21. The power converter according to claim 20, wherein the smoothing control means detects the ripple of the first storage portion and controls the power flow of the bi-directional power conversion unit such that the detected ripple becomes small.

22. The power converter according to claim 20, wherein the smoothing control means detects the lower harmonic of the output voltage of the power conversion unit and/or the lower harmonic of the output current, and controls the bi-directional power conversion unit such that the ripple of the first storage portion becomes small in accordance with the lower harmonic.

23. The power converter according to claim 12, wherein the direct current power source is either the solar cell or the fuel cell.

24. The power converter according to claim 12, wherein the power source comprises a solar cell or a fuel cell and a DC/DC converter for voltage-converting and outputting a direct output from the solar cell or the fuel cell.

25. A power unit comprising the direct current power source and the power converter according to claim 12 connected to the direct current power source.

* * * * *

UNITED STATES PATENT AND TRADEMARK OFFICE
CERTIFICATE OF CORRECTION

PATENT NO. : 6,963,147 B2
APPLICATION NO. : 10/792713
DATED : November 8, 2005
INVENTOR(S) : Seiji Kurokami et al.

It is certified that error appears in the above-identified patent and that said Letters Patent is hereby corrected as shown below:

On Title Page:
(57) ABSTRACT, Line 6, "a" should read -- an --.

COLUMN 6:
Line 16, "a" should read -- an --.

COLUMN 7:
Line 17, "outputs" should read -- output --.

COLUMN 9:
Line 33, "an" should read -- a --; and

COLUMN 10:
Line 53, "denote" should read -- denotes --.

COLUMN 12:
Line 7, "each" should read -- to each --.

COLUMN 13:
Line 64, "three-" should read -- three --.

COLUMN 14:
Line 34, "time)" should read -- time). --; and
Line 51, "above-describe" should read -- above-described --.

COLUMN 17:
Lines 47 and 48, "six" should -- sixth --.

COLUMN 19:
Line 44, "six" should read -- sixth --.

COLUMN 20:
Lines 21 and 24, "become" should read --becomes --;
Line 28, "exits" should read -- exists --; and
Line 59, "voltage" should read -- voltages --.

COLUMN 21:
Line 8, "applied the" should -- applied to the --;
Line 11, "before applied the" should read -- before being applied to the --; and
Line 63, "in" should read -- by --.

UNITED STATES PATENT AND TRADEMARK OFFICE
CERTIFICATE OF CORRECTION

PATENT NO. : 6,963,147 B2
APPLICATION NO. : 10/792713
DATED : November 8, 2005
INVENTOR(S) : Seiji Kurokami et al.

It is certified that error appears in the above-identified patent and that said Letters Patent is hereby corrected as shown below:

COLUMN 22:
Line 24, "phases;" should read -- phases, --; and
Line 67, "in case" should read -- in a case --.

COLUMN 23:
Line 34, "in case" should read -- in a case --.

COLUMN 24:
Line 7, "current i" should read -- current i1 --.

Signed and Sealed this

Twenty-first Day of November, 2006

JON W. DUDAS
*Director of the United States Patent and Trademark Office*